(12) United States Patent
Wessel et al.

(10) Patent No.: US 8,837,661 B2
(45) Date of Patent: Sep. 16, 2014

(54) RADIONUCLIDE PRODUCTION USING A Z-PINCH NEUTRON SOURCE

(75) Inventors: Frank J. Wessel, Irvine, CA (US); Hafiz Ur Rahman, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 576 days.

(21) Appl. No.: 12/842,472

(22) Filed: Jul. 23, 2010

(65) Prior Publication Data

US 2011/0019789 A1    Jan. 27, 2011

Related U.S. Application Data

(60) Provisional application No. 61/228,532, filed on Jul. 24, 2009, provisional application No. 61/230,085, filed on Jul. 30, 2009.

(51) Int. Cl.
| | |
|---|---|
| *G21G 1/06* | (2006.01) |
| *G21B 1/03* | (2006.01) |
| *H05H 3/06* | (2006.01) |
| *H05H 1/06* | (2006.01) |

(52) U.S. Cl.
CPC . *G21G 1/06* (2013.01); *Y02E 30/14* (2013.01); *G21B 1/03* (2013.01); *H05H 3/06* (2013.01); *H05H 1/06* (2013.01)
USPC .......................................... 376/158; 376/188

(58) Field of Classification Search
USPC ............................. 376/145, 186, 188
See application file for complete search history.

(56) References Cited

U.S. PATENT DOCUMENTS 5,764,715 A * 6/1998 Maenchen et al. ............ 376/201

OTHER PUBLICATIONS

Ruiz et al., "Production of Thermonuclear Neutrons from Deuterium-Filled Capsule Implosions Driven by Z-Pinch Dynamic Hohlraums." PRL v. 93, n. 1 Jul. 2, 2004.*
Lindl, "Intertial Confinement Fusion," Chapter 10, AIP Press 1998.*
Ney, et al. "Staged Z pinch for controlled fusion" Physics of Plasmas vol. 8, No. 2 Feb. 2001.*
Nay et al., "Staged Z Pinch for Controlled Fusion," Phys. Plasmas v. 8, n. 2 Feb. 2001.*
Lindl, "Inertial Confinement Fusion," Chapter 10: Hohlraum Plasma Conditions AIP 1998.*
Ruiz et al., "Production of Thermonuclear Neutrons from Deuterium-Filled Capsule Implosions Driven by Z-Pinch Dynamic Hohlraums" Phys. Rev. Letts. v.93, No. 1 Jul. 2004.*

* cited by examiner

*Primary Examiner* — Jack W Keith
*Assistant Examiner* — Sean P Burke
(74) *Attorney, Agent, or Firm* — Marcus C. Dawes; Daniel L. Dawes

(57) ABSTRACT

Radionuclides are produced with a pulsed neutron flux from a multiple repetition rate staged Z-pinch machine, the pulsed neutron flux is moderated, an activatable radionuclide precursor is exposed to the moderated pulsed neutron flux, and a corresponding radionuclide from the activatable radionuclide precursor is produced. High current pulses are passed through a target plasma of fusible material enclosed in a cylindrical liner plasma composed of a high-Z plasma to generate a magnetic field that compresses the liner plasma, and generates shock waves. The shock implodes the target plasma. The shock front propagates between an outer shock front and an axis of the target plasma so it is heated through shock dissipation and by adiabatic compression due to an imploding shock front produced in the outer liner plasma to fuse light nuclei and generate alpha particles and neutrons. Alpha particles trapped within the magnetic field further heat the target plasma.

12 Claims, 1 Drawing Sheet

RADIONUCLIDE PRODUCTION USING A Z-PINCH NEUTRON SOURCE

RELATED APPLICATIONS

The present application is related to U.S. Provisional Patent Application Ser. Nos. 61/228,532, filed on Jul. 24, 2009, and 61/230,085 filed on Jul. 30, 2009, which are incorporated herein by reference and to which priority is claimed pursuant to 35 USC 119.

BACKGROUND OF THE INVENTION

1. Field of the Invention

The invention relates to the field of production of radionuclides from Z-pinch machines.

2. Description of the Prior Art

Radionuclides are used in the medical field for both diagnostic and therapeutic purposes and there are other applications where radionuclides are used commonly. At present radionuclides are produced in research-based nuclear (fission) reactors, for which production is limited, hazardous, inconvenient and expensive. Commonly used medical radionuclides have a half-life of the order of minutes, which poses other problems for transportation and handling.

The reactor requires transuranic nuclear fuel elements to power the reactors. The reactor is expensive to operate and maintain, and requires highly specialized expertise. There are issues related to nuclear proliferation and security. Nuclear reactors are costly (>$10's M US), and only a limited number of research-based reactors are used for radionuclide production.

The growing need for radionuclides in the medical field and elsewhere is attractive, particularly for a small machine that can produce neutrons at the location of use, since many of the commonly used radionuclides have short radioactive half-lives. Neutron activated radionuclides could be used for both therapeutic and diagnostic purposes. The dosage mass could be in micro-to-milligram levels. The radionuclide could be used for variety of diseases related to heart and cancer. For the past decades virtually 1 out of 3 heart and cancer patients have received or been treated with radionuclides.

Every major hospital in the United States has a nuclear medicine department in which radionuclides are used to diagnose and treat a wide variety of diseases more effectively and safely by "seeing" how the disease process alters the normal function of an organ. To obtain this information, a patient either swallows, inhales, or receives an injection of a tiny amount of a radionuclide. Special cameras reveal where the radioactivity accumulates briefly in the body, providing, for example, an image of the heart that shows normal and malfunctioning tissue.

Radionuclides are also used in laboratory tests to measure important substances in the body, such as thyroid hormone. Radionuclides are used to effectively treat patients with thyroid diseases, including Graves disease, one of the most common forms of hyperthyroidism {and thyroid cancer. The use of ionizing radiation has led to major improvements in the diagnosis and treatment of patients with cancer. These innovations have resulted in increased survival rates and improved quality of life. Mammography can detect breast cancer at an early stage when it may be curable. Needle biopsies are more safe, accurate, and informative when guided by x-ray or other imaging techniques. Radiation is used in monitoring the response of tumors to treatment and in distinguishing malignant tumors from benign ones. Bone and liver scans can detect cancers that have spread. Half of all people with cancer are treated with radiation, and the number of those who have been cured continues to rise. There are now tens of thousands of individuals alive and cured from various cancers as a result of radiotherapy. In addition, there are many patients who have had their disease temporarily halted by radiotherapy. Radionuclides are also being used to decrease or eliminate the pain associated with cancer, such as that of the prostate or breast that has spread to the bone. Radionuclides are a technological backbone for much of the biomedical research being done today. They are used in identifying and learning how genes work. Much of the re-search on AIDS is dependent upon the use of radionuclides. Scientists are also "arming" monoclonal antibodies that are produced in the laboratory and engineered to bind to a specific protein on a patient's tumor cells with radionuclides. When such "armed" anti-bodies are injected into a patient, they bind to the tumor cells, which are then killed by the attached radioactivity, but the nearby normal cells are spared. So far, this approach has produced encouraging success in treating patients with leukemia.

Most new drugs, before they are approved by the Food and Drug Administration, have undergone animal studies that use radionuclides to learn how the body metabolizes them. Most of the radionuclides used in pharmaceutical industry are produced in the research nuclear reactors by neutron activation method. Conventional nuclear reactor is a copious source of neutron with energy ranging from less than eV to several MeV. The energy of thermal and epithermal neutrons range from 0.025-0.2 eV which can be absorbed by the nucleus to become a radioactive nucleus. The higher energy neutrons need to be thermalized using moderators made of polyurethane, graphite, water or heavy water. Due to a wide spectrum in energy of the neutrons produced in a reactor it is very hard to place the sample at a proper location for effective neutron activations which requires a minimum flux of $10^{10}$ cm$^{-2}$ sec$^{-1}$.

What is needed is a source of radionuclides that overcomes each of the drawbacks of the prior art production methods and apparatus and still fulfills the same production needs.

BRIEF SUMMARY OF THE INVENTION

The specific Z-pinch technology of the illustrated embodiment makes use of a staged Z-pinch, which is a pulsed-power device that compresses a fusible material, for example, deuterium (D) and tritium (T) in a cylindrical, high-Z shell (like radon, xenon, krypton, etc). The staged Z-pinch machine produces a nanosecond plasma compression, characterized by high temperature (>5 KeV) and high number density (>$10^{23}$ cm$^{-3}$), which is suitable for high-yield fusion and a high flux of neutrons, $10^{15}$ pulse$^{-1}$. This specific arrangement produces a high flux of neutrons sufficient to produce radionuclides rapidly at low cost.

A comparatively inexpensive, staged Z-pinch machine, currently costing less than one million dollars, produces the exact quantity of radionuclide required, without the use of dangerous fission nuclear material. There is no fear of nuclear proliferation since transuranic materials are not used. The radionuclide can be produced in a limited quantity for medical use only. Such a small Z-pinch may prove to be a relatively inexpensive source and could be located near patients, in hospitals, and in universities. A high repetition-rate machine could produce radionuclides on an as-needed basis, and in a cost-effective manner. A high repetition-rate Z-pinch machine could be used as a pulsed source of fusion neutrons. These neutrons would be either 2.45 MeV or 14.1 MeV with high fluence and intensity. Neutrons could be directed onto various precursor materials, which may be activated as radionuclides through neutron irradiation.

The illustrated method of production makes available a new class of radionuclides with much shorter half life that could be produced locally for clinical applications. This reduces the adverse effects of using radiation with a longer half-life, because the handling and transportation time needed to produce the radionuclide can be shorter.

More specifically, the illustrated embodiments include a method of producing radionuclides comprising the steps of producing a pulsed neutron flux from a multiple repetition rate staged Z-pinch machine, moderating the pulsed neutron flux, exposing an activatable radionuclide precursor to the moderated pulsed neutron flux, and producing a corresponding radionuclide from the activatable radionuclide precursor.

The step of producing a neutron flux using staged Z-pinch comprises producing a neutron flux using a pulsed-power device that compresses a fusible material in a cylindrical, high-Z shell.

The step of producing a neutron flux using a pulsed-power device that compresses a fusible material comprises compressing deuterium (D), tritium (T) or a mixture thereof until fusion is achieved and neutrons produced.

The step of producing a neutron flux using a pulsed-power device that compresses a fusible material in a cylindrical, high-Z shell comprises compressing a fusible material in a cylindrical shell composed of radon, xenon, krypton, or other inert gas.

The step of producing a neutron flux using staged Z-pinch comprises producing a nanosecond plasma compression of fusible material characterized by a predetermined temperature range (10-30 KeV) and a number density ($10^{23}$ cm$^{-3}$) to achieve fusion and a flux of neutrons of at least $10^{15}$ neutrons per pulse.

The step of producing a pulsed neutron flux from a multiple repetition rate staged Z-pinch machine comprises flowing a high current pulses of the order of several hundred kA with a rise time of the order of a few hundred nano seconds through a cylindrical liner plasma composed of a high-Z plasma with an embedded low-Z (deuterium, $D_2$ or tritium, $T_2$) target plasma contained within the cylindrical liner, to generate an azimuthal magnetic field that compresses the liner plasma with a supersonic radial velocity, generating shock waves ahead of an imploding piston stagnating at an intermediate boundary of the liner plasma and target plasma resulting into a shock front, the shock front acting as a secondary piston that implodes the target plasma and resulting into a shock front that propagates back and forth between an outer shock front and an axis of the target plasma so that heating of the target plasma is achieved initially through shock dissipation followed by adiabatic compression due to an imploding shock front produced in the outer liner plasma to reach a temperature of several KeV to fuse light nuclei in the target plasma resulting in the generation of alpha particles and neutrons. Trapping the alpha particles within the magnetic field to cause further heating of the target plasma, whereby plasma instabilities are controlled, target-plasma heating due to shock heating and shock compression and alpha particle heating of the target plasma is achieved.

The pulsed current of few hundred kJ pulsed power produces $10^{15}$-$10^{16}$ neutrons per shot repeated at rates from 0.1-1 Hz.

The pulsed power compresses fusible deuterium ($D_2$) or tritium ($T_2$) or a mixture thereof in a cylindrical shell of high-Z material to provide stable compression leading to high temperature (10-30 keV) and high number density ($10^{23}$ cm$^{-3}$) of the fusible material.

The activatable radionuclide is a pharmaceutical radionuclide and is exposed to a neutron flux of at least $10^9$-$10^{10}$ cm$^{-2}$ sec$^{-1}$ using a repetition rate of at least one pulse every 10 seconds to activate a surface area of pharmaceutical radionuclide of approximately $10^3$ cm$^2$.

The method further includes the step of producing a plurality of radioisotopes simultaneously by positioning a plurality of activatable radionuclide precursors around a Z-pinch chamber in a corresponding plurality of locations defined outside of a moderator.

The plurality of radioisotopes comprises pharmaceutical radionuclides including $^{99}$Mo, $^{24}$Na, $^{32}$P, $^{82}$Br, $^{56}$Mn, $^{64}$Cu, or $^{198}$Au and where a level of activity produced by neutron activation is controlled by irradiating with predetermined number of shots fired by the staged Z-pinch machine.

The pulsed neutron flux is mono-energetic and where the activatable radionuclide precursor is formed as a thin layer about the location of the production of neutrons so that substantially all of the neutron flux is incident on the thin layer whereby controlled activation of the activatable radionuclide precursor is realized.

The scope of the illustrated embodiments also include an apparatus for producing radionuclides comprising a multiple repetition rate staged Z-pinch machine for producing a pulsed neutron flux, a moderator for receiving the pulsed neutron flux and thermalizing the neutron flux, and an activatable radionuclide precursor positioned in a thin shell exterior to the moderator to intercept substantially all of the neutron flux so that a corresponding radionuclide from the activatable radionuclide precursor is produced.

The staged Z-pinch machine comprises a pulsed-power source coupled to a target plasma of fusible material enclosed within a high-Z plasma shell.

The target plasma of a fusible material comprises a plasma of deuterium (D), tritium (T) or a mixture thereof.

The high-Z plasma shell comprises a plasma shell of radon, xenon, krypton, or other inert gas.

The target plasma of fusible material is characterized by a predetermined temperature range of approximately 10-30 KeV and a number density of at least $10^{23}$ cm$^{-3}$.

The pulsed current source produces a few hundred kJ of pulsed power repeated at rates from 0.1-1 Hz.

The activatable radionuclide is a pharmaceutical radionuclide and is exposed to a neutron flux of at least $10^9$-$10^{10}$ cm$^{-2}$ sec$^{-1}$ using a repetition rate of at least one pulse every 10 seconds to activate a surface area of pharmaceutical radionuclide of approximately $10^3$ cm$^2$.

The apparatus further includes a plurality of radioisotope precursors in a corresponding plurality of locations defined outside of a moderator.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
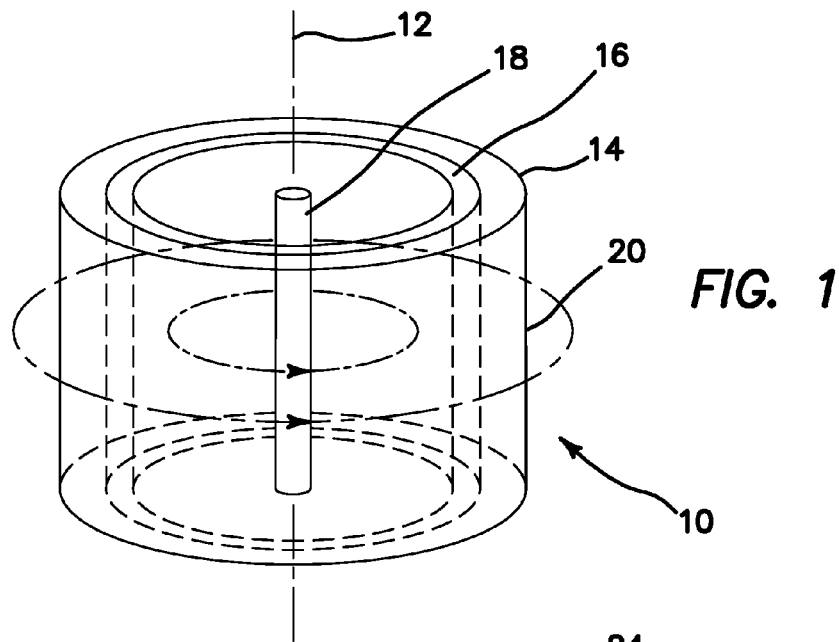
FIG. 1 is a diagram of the staged Z-pinch chamber.

The illustrated embodiment in FIG. 1 is directed to a neutron source called staged Z-pinch machine 10, which is built and operated on a relatively small scale in highly cost effective way. Neutrons produced in a staged Z-pinch machine 10 are either 3.02 MeV or 14.1 MeV in a hot and dense plasma with size less than a millimeter in radius and one centimeter in length produced at the axis 12 of the staged Z-pinch chamber 14. The flux of these neutrons is comparable to the flux produced in normal research reactor. These neutrons can be thermalized at a fixed location outside the chamber 14 and can be used effectively in producing radionuclides.

Use of the staged Z-pinch machine 10 as diagrammatically depicted in FIG. 1 as an intense neutron source is a unique concept to produce high flux of neutrons capable of producing a significant level of neutron activation. In the illustrated embodiment a very large current flows through a cylindrical liner 16 made of high-Z plasma with an embedded low-Z (deuterium, $D_2$ or tritium, $T_2$) target plasma 18, the nuclei of which fuse to release thermonuclear neutrons (3.5 MeV and 14 MeV) and charged (alpha, $\alpha$) particles. The schematic of the load region in staged Z-pinch machine 10 is shown in FIG. 1. This kind of load region can be formed form a conventional double gas puff valve. The outer gas includes Kr, Xe or Rn which produces highly radiative plasma 16. The target plasma 18 is formed from a deuterium or a deuterium-tritium mixture. The load region 14 with maximum length of 1-2 cm is connected to a high repetition rate pulsed current power source (not shown) that delivers energy in the form of current pulses of several hundred kA with few hundred nano seconds rise time.

Once the current starts flowing through the target plasma 18, it generates an azimuthal magnetic field 20 that compresses the liner plasma 16 with a supersonic radial velocity. Shock waves are generated ahead of the imploding piston stagnating at the intermediate boundary of the liner plasma 16 and target plasma 18 resulting into a powerful shock front. This shock front acts as a secondary piston that implodes the target plasma 18 in a very stable manner. Shock waves also propagate in the target plasma 18 with much higher speed resulting into a shock front that propagates back and forth between outer shock front and the axis 12 of the pinch. The advantage of this staged implosion is the control of Rayleigh-Taylor instabilities that usually diminishes the performance of normal Z-pinch.

Heating of the target plasma 18 is achieved initially through a shock dissipation mechanism followed by adiabatic compression due to an imploding powerful shock front produced in the outer liner plasma 16. Once the temperature reaches to several KeV the fusion of light nuclei begins resulting into alpha particles and neutrons. The alpha particles are trapped due to the extremely large magnetic field 20, a special feature of the staged Z-pinch, and causes further heating of the plasma. The staged Z-pinched apparatus and its physics are further discussed in U.S. Provisional Patent Application 61/230,085 filed on Jul. 30, 2009, which is incorporated herein by reference.

The basis for the staged Z-pinch is (1) controlling plasma instabilities, (2) target-plasma heating due to shock heating and shock compression, (3) alpha particle heating and therefore, efficient-energy coupling. Modest energy of few hundred kJ pulsed power staged Z-pinch produces $10^{15}$-$10^{16}$ neutrons per shot that can be repeated at rates from 0.1-1 Hz. At 50 cm away from the axis 12 this flux translates into $10^{11}$-$10^{12}$ neutrons per shot.

A high repetition-rate Z-pinch machine provides a pulsed source of fusion neutrons. These neutrons would be either 3.02 MeV or 14.1 MeV and have high fluence and intensity. These neutrons could be directed onto various kinds of precursor materials which are activated as radionuclides through neutron irradiation.

In summary, the specific Z-pinch technology makes use of a staged Z-pinch, which uses pulsed power to compress a fusible material, like deuterium ($D_2$) or tritium ($T_2$) in a cylindrical shell of high-Z material like radon, xenon, krypton, etc. The staged Z-pinch configuration produces a stable compression leading to high temperature (10-30 keV) and high number density ($10^{23}$ $cm^{-3}$) suitable for fusion of deuterium and tritium. As a result the high flux of neutrons will be produced, e.g. $10^{16}$ per pulse. Based upon the design of the machine 10 the flux of neutrons can be strong enough to produce radionuclides in a very cost effective way. The growing need of radionuclides in medical field and other applications make this option where a small machine can effectively produce at the location of use.

Figure 2:
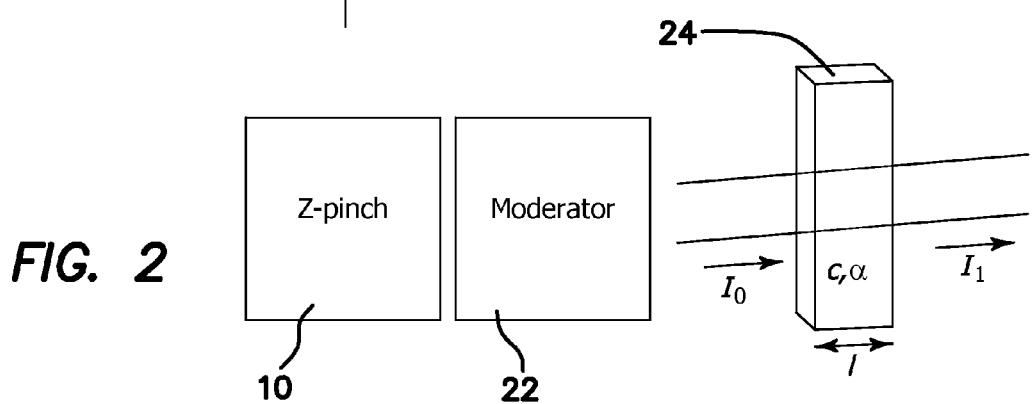
FIG. 2 is a diagram of radionuclide production using an intervening moderator outside the Z-pinch chamber to thermalize the neutrons incident on the activatable material.

Turn now and consider in more detail the production of radionuclides from a staged Z-pinch machine 10. A staged Z-pinch implosion occurs in a cylindrical vacuum chamber 14 of 30-50 cm radius and 10-20 cm height. The fusion neutrons produced on the axis of this chamber 14 escape the thin wall of the vacuum chamber 14. The first step is to thermalize the energy of these neutrons from 3.02 MeV and 14.1 MeV to less than 1 eV using moderators 22 placed inside and outside the chamber 14. In this case the best moderators 22 are made of polyurethane with 10-20 cm thickness wrapped around the vacuum chamber 14. FIG. 2 is a schematic depiction of the production of radionuclides. Thin layer of material 24 (1-2 cm) that needs to be activated by the thermalized neutrons can be placed outside the vacuum chamber 14 and behind the moderators 22 where it can be easily handled. A high repetition rated machine 10 can be operated for a sufficiently long time, which will be used as a continuous source of pulsed neutrons to produce the required level of radioactivity. The number of shots in Z-pinch machine 10 required for different kinds of material and the level of radioactivity may vary. This approach may also provide the possibility of producing many types of radionuclides simultaneously by placing different materials in different pockets around the chamber 14. The handling of these radionuclides is relatively simple as compared to the handling in the nuclear reactor.

Pharmaceutical radionuclides are commonly produced in research reactors of 100-200 kW with a neutron flux of $10^{11}$-$10^{13}$ $cm^{-2}$ $sec^{-1}$ with an energy range from approximately 0.025 eV to several MeV. The minimum requirement to create effective radioactivity for medical purpose is $10^9$-$10^{10}$ $cm^{-2}$ $sec^{-1}$. The sample of material 24 is irradiated for several days to achieve enough level of radioactivity to be useful for diagnostic or therapeutic purpose. Assuming a neutron pulse of $10^{16}$ produced in a staged Z-pinch after every 10 seconds in a high repetition rate machine 10 will provide a flux of $10^{11}$ cm$^{-2}$ sec$^{-1}$ at 50 cm away from the Z-pinch machine 10. It will activate a surface area of approximately $10^3$ cm$^2$. Thus, the material 24 which needs to be activated can a surface area of approximately $10^3$ cm$^2$ with a thickness of few millimeters to a centimeter. If the target material 24 is liquid with a liquid mass density of 1-10 gm/cm$^3$ then the total amount of material 24 that can be activated is approximately 1-10 Kg in few days.

All the neutrons produced by Z-pinch machine 10 will not be absorbed to produce radionuclides. The schematic of thermalization and absorption in the sample is shown in FIG. 2. The intensity transmitted through a sample is determined if the cross section of the interaction and the density of the material 24 are known. That is, $$l_1 = l_0 \exp(-\rho \sigma l) \quad (1)$$

where, $\sigma$ is the cross section, l is the length and $\rho$ is the mass density. Now if $\sigma$ for the radionuclide Mo99 is 3 barns for thermal neutrons, and the liquid number density is $10^{23}$ cm$^{-3}$, and l is 1 cm, then an amount absorbed in the sample $$l_{absorbed} = l_0 - l_1 = 0.26 \times l_0 \quad (2)$$

If the thermal flux of neutrons is $10^{12}$ cm$^{-2}$ per shot than the number of nuclei in the liquid has been activated will be approximately $2.6 \times 10^{11}$ cm$^{-3}$ per shot. From Eq. 1 we can estimate the specific activity by irradiating the sample for certain period of time using high repetition rate machine 10. The decay of an unstable nucleus is entirely random and it is impossible to predict when a particular atom will decay. However, it is equally likely to decay at any time. Therefore, given a sample of a particular radioisotope, the number of decay events –dN expected to occur in a small interval of time dt is proportional to the number of atoms present. If N is the number of atoms, then the probability of decay (–dN/N) is proportional to dt:

$$dN/N = \lambda dt \quad (3)$$

Particular radionuclides decay at different rates, each having its own decay constant ($\lambda$). The negative sign indicates that N decreases with each decay event. The solution to this first-order differential equation is the following function:

$$N(t) = N_0 e^{-\lambda t} = N_0 e^{-t/\tau} \quad (4)$$

Where $N_0$ is the value of N at time zero (t=0). The equation (4) recognizes that the differential decay constant $\lambda$ has units of 1/time, and can thus also be represented as $1/\tau$, where $\tau$ is a characteristic time for the process. This characteristic time is called the time constant of the process. In radioactive decay, this process time constant is also the mean lifetime for decaying atoms. Each atom "lives" for a finite amount of time before it decays, and it may be shown that this mean lifetime is the arithmetic mean of all the atoms' lifetimes, and that it is $\tau$, which again is related to the decay constant as follows:

$$T = 1/\lambda \quad (5)$$

The previous exponential function generally represents the result of exponential decay. It is only an approximate solution, for two reasons. Firstly, the exponential function is continuous, but the physical quantity N can only take non-negative integer values. Secondly, because it describes a random process, it is only statistically true. However, in most common cases, N is an extremely large number (comparable to Avogadro's number) and the function is a good approximation. A more commonly used parameter is the half-life. Given a sample of a particular radionuclide, the half-life is the time taken for half the radionuclide's atoms to decay. The half life is related to the decay constant as follows:

$$t_{1/2} = \ln 2/\lambda = \tau \ln 2 \quad (6)$$

For Mo99 the $t_{1/2}$ is 66 hours which means that $\tau$ is about 95 hours. The specific activity $S_A \approx 1.0$ µCi per shot. In order to have 10 mCi which is an average requirement for pharmaceutical radionuclides we need at least 10,000 shots on a time scale much less than the characteristic time $\tau$. A machine 10 with a repetition rate with one shot per 10 second can produce this in 30 hours. By placing the material 24 closer to the Z-pinch chamber 14 we can reduce this limit. If the materials 24 to be irradiated is placed around the Z-pinch chamber 14 at about 50 cm radius in a shell of 1 cm thick and 10 cm tall can produce few Kg of radioactive isotopes in 1-2 days.

Several kinds of radioisotopes can be produced simultaneously by partitioning this shell and placing these materials in different pockets. This machine 10 is a pulsed machine and number of shots that will irradiate the target material 24 will determine the level of radioactivity produced in the sample. This will establish the quality control much easier as compared to the radionuclides produced in the reactor where the quality control is established after random irradiation in the reactor where the neutron flux is based on pure estimation. A pulsed mechanism provides a better control on production of desired level of activity. This is commonly desired for most of the pharmaceutical radionuclides like $^{99}$Mo, $^{24}$Na, $^{32}$P, $^{82}$Br, $^{56}$Mn, $^{64}$Cu, $^{198}$Au etc. Most of these radionuclides have a very short half life which is a requirement for the pharmaceutical use. Some of these can only be delivered to medical centers close to the research nuclear reactor. Therefore it is important that the level of activity produced by neutron activation have better control than can be achieved by irradiating with specific number of shots fired by the machine 10. An important feature of present technique is that reasonably small size machine 10 can be built to place closer to the medical centers where these radionuclides need to be administered to the patients.

Figure 3:
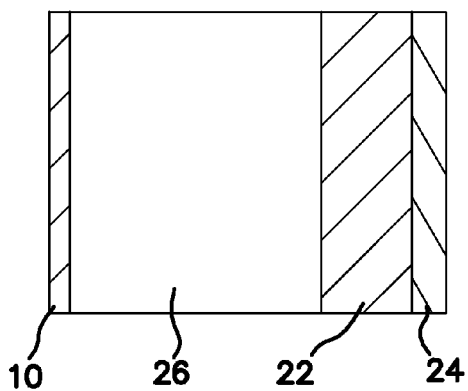
FIG. 3 is a diagram of radionuclide production using an intervening vacuum space between the chamber and the moderator to thermalize the neutrons incident on the activatable material disposed onto the moderator as a thin layer or shell.

Another feature of staged Z-pinch produced neutrons is that the neutrons are mono-energetic either 3.02 MeV or 14.1 MeV and can be thermalized at the surface required for irradiation as diagrammatically depicted in FIG. 3, where a source of neutrons, such as the outer surface of chamber 14 is spaced by a vacuum 26 from a moderator defining a sample pocket into which a thin layer of activatable material 24 is disposed. Because high monoenergetic neutrons are provided by the Z-pinch, the moderation provided can be tailored to absorb a predetermined amount of energy so that a monoenergetic or nearly monoenergetic source of neutrons is provided at any lower energy, namely at a resonance absorption energy of the radionuclide precursor. The exploitation of tailored energy levels of the neutrons is not possible with a reactor source where the neutrons which are produced are only available as thermalized lower energy spectra. Contrary to reactors, the sample can utilize most of the neutron flux in a very thin layer 24 shown in FIG. 3 and the sample can be handled in a much easier fashion. The cost of staged Z-pinch will be much lower than the cost of a research reactor and can easily be afforded by any major medical center.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of producing radionuclides comprising:
producing a repetitively pulsed neutron flux from a multiple repetition rate staged Z-pinch machine with a pulsed neutron flux of at least $10^{15}$ neutrons per pulse;
moderating the pulsed neutron flux;
exposing an activatable radionuclide precursor to the moderated pulsed neutron flux; and
producing a corresponding radionuclide from the activatable radionuclide precursor utilizing direct drive magneto-inertial confinement of fusible material.

2. The method of claim 1 where producing a neutron flux using staged Z-pinch comprises producing a neutron flux using a pulsed-power device that compresses a fusible material in a cylindrical, high-Z shell.

3. The method of claim 1 where producing a pulsed neutron flux from a multiple repetition rate staged Z-pinch machine and moderating the pulsed neutron flux comprises producing monoenergetic neutrons at a predetermined energy level and moderating the monoenergetic neutrons to an energy level lower than the predetermined energy level and at a resonance absorption peak of the activatable radionuclide precursor.

4. The method of claim 2 where producing a neutron flux using a pulsed-power device that compresses a fusible material in a cylindrical, high-Z shell comprises compressing a fusible material in a cylindrical shell composed of radon, xenon, krypton, or other inert gas.

5. The method of claim 1 where producing a neutron flux using staged Z-pinch comprises producing a nanosecond plasma compression of fusible material characterized by a temperature range of 10-30 keV and a plasma number density ($10^{23}$ cm$^{-3}$) to achieve fusion and a flux of neutrons of at least $10^{15}$ neutrons per pulse.

6. The method of claim 1 where producing a pulsed neutron flux from a multiple repetition rate staged Z-pinch machine comprises:
flowing high current pulses of the order of several hundred kA with a rise time of the order of a few hundred nano seconds through a cylindrical liner plasma composed of a high-Z plasma with an embedded low-Z target plasma contained within the cylindrical liner
generating an azimuthal magnetic field,
compressing the liner plasma with a supersonic radial velocity,
generating shock waves,
creating a shock front which stagnates at an intermediate boundary between the liner plasma and target plasma,
oscillating the shock front between an outer shock front position and an axis of the target plasma,
heating the target plasma initially through shock dissipation followed by adiabatic compression to a temperature of several KeV,
fusing light nuclei in the target plasma,
generating alpha particles and neutrons,
trapping the alpha particles within the azimuthal magnetic field, and
further heating the target plasma,
whereby plasma instabilities are controlled, target-plasma heating due to shock heating and shock compression, and alpha particle heating of the target plasma is achieved.

7. The method of claim 6 where the step of flowing high current pulses comprises flowing a pulsed tera-watt current and further comprising producing $10^{15}$-$10^{16}$ neutrons per pulse repeated at rates from 0.1-1 Hz.

8. The method of claim 6 where pulsed power compresses fusible deuterium ($D_2$) or tritium ($T_2$) or a mixture thereof in a cylindrical shell of high-Z material to provide stable compression leading to a required temperature of 10-30 keV and a plasma number density of $10^{23}$ cm$^{-3}$ of the fusible material.

9. The method of claim 1 where the activatable radionuclide is a pharmaceutical radionuclide having an activatable surface area of approximately $10^3$ cm$^2$ and where the step of exposing an activatable radionuclide precursor to the moderated pulsed neutron flux comprises exposing the pharmaceutical radionuclide to a neutron flux of at least $10^9$-$10^{10}$ cm$^{-2}$ sec$^{-1}$ with a repetition rate of at least one pulse every 10 seconds to activate the surface area of pharmaceutical radionuclide.

10. The method of claim 1 further comprising producing a plurality of radioisotopes simultaneously by positioning a plurality of activatable radionuclide precursors around a Z-pinch chamber in a corresponding plurality of locations defined outside of a moderator.

11. The method of claim 10 where the plurality of radioisotopes comprises pharmaceutical radionuclides including $^{99}$Mo, $^{24}$Na, $^{32}$P, $^{82}$Br, $^{56}$Mn, $^{64}$Cu, or $^{198}$Au and where a level of activity produced by neutron activation is controlled by irradiating with a plurality of shots fired by the staged Z-pinch machine.

12. The method of claim 1 where the step of producing a repetitively pulsed neutron flux comprises producing a monoenergetic pulsed neutron flux, where the activatable radionuclide precursor is formed as a layer of 1-2 cm thickness and where the step of exposing an activatable radionuclide precursor to the moderated pulsed neutron flux comprises directing substantially all of the neutron flux onto the layer, whereby controlled activation of the activatable radionuclide precursor is realized.

\* \* \* \* \*